United States Patent [19]

Meuschke et al.

[11] Patent Number: 5,442,666
[45] Date of Patent: Aug. 15, 1995

[54] APPARATUS FOR STORING CONTROL DRIVE ROD SHAFTS DURING CHEMICAL DECONTAMINATION OF A REACTOR

[75] Inventors: Robert E. Meuschke, Monroeville; Thomas G. Bengel, Plum Borough; Frank I. Bauer, Perry Township; Phillip E. Miller, Greensburg, all of Pa.

[73] Assignee: Westinghouse Electric Corporation, Pittsburgh, Pa.

[21] Appl. No.: 206,306

[22] Filed: Mar. 4, 1994

[51] Int. Cl.⁶ .............................................. G21C 19/06
[52] U.S. Cl. .................................. 376/272; 220/4.21; 220/692
[58] Field of Search ............... 376/260, 261, 272, 287, 376/463; 250/506.1, 507.1; 220/4.06, 4.07, 4.21, 692

[56] References Cited

U.S. PATENT DOCUMENTS

| 3,575,601 | 4/1971 | Lindsay et al. | 376/272 |
| 3,845,315 | 10/1974 | Blum | 376/272 |
| 4,313,793 | 2/1982 | Klumb et al. | 376/260 |
| 4,803,042 | 2/1989 | Gilmore et al. | 376/272 |

Primary Examiner—Daniel D. Wasil

[57] ABSTRACT

A tank is disclosed for containing a liquid in which control rod drive shafts of a nuclear power plant are stored. The tank comprises a lower tank portion having a bottom and a tank wall extending outwardly from the bottom for defining a lower storage cavity of the tank. An upper tank portion having walls is removably attached to the lower tank portion for defining an upper storage cavity of the tank. A plurality of tubes are arranged in the lower tank portion for adaptably receiving the shafts for storage.

7 Claims, 4 Drawing Sheets

APPARATUS FOR STORING CONTROL DRIVE ROD SHAFTS DURING CHEMICAL DECONTAMINATION OF A REACTOR

BACKGROUND OF THE INVENTION

1. Field of the Invention

The present invention relates generally to apparatus for storing control rod drive shafts during chemical decontamination of a reactor vessel and, more particularly, to such apparatus for removing the shafts from the reactor vessel and placing them in a storage tank while maintaining the shafts completely submerged in borated water.

2. Background of the Invention

In nuclear power generation, a reactor vessel is the primary vessel wherein heat is generated for producing steam. The reactor vessel includes a flanged body having a flanged, removable upper closure head bolted atop its upper portion for forming a sealed enclosure. Fuel pellets, which are located within fuel assemblies, are positioned within the reactor vessel for producing a controlled nuclear fission which, in turn, generates the necessary heat. Process piping, generally referred to in the art as a primary loop, is attached to the reactor vessel for passing borated water contained in the reactor vessel therethrough. Borated water is contained within the reactor vessel for conveying the generated heat away the reactor vessel. The borated water flows out of the reactor vessel and passes through the primary loop to a steam generator for transferring its heat to a secondary loop, wherein steam is produced for ultimately producing electrical power, as is well known in the art. The borated water then returns to the reactor vessel via the primary loop where the above described process is repeated.

To control the nuclear fission process, a plurality of control rods are either selectively inserted or withdrawn from the fuel assemblies. Control rods are typically stainless steel tubes encapsulating an absorber material, and are grouped together in a predetermined number, generally sixteen, forming a control rod cluster. The control rod clusters extend into the fuel assemblies when fully inserted, and when the control rod clusters are withdrawn, they extend up and away from the fuel assemblies.

A control rod drive shaft is attached to each cluster and extends upwardly away from the fuel assemblies where each shaft is attached to a control rod drive mechanism (CRDM) for axially moving the control rod shafts and, in turn, the absorber material within the stainless steel tubes. An electromagnetic coil stack assembly is attached to the CRDM for electromagnetically supplying the CRDM the energy necessary to move the control rod clusters.

During reactor operation, corrosion creating products such as ions are found throughout the primary loop. These products circulate with the borated water through the reactor, where they may become irradiated or activated by the nuclear process occurring therein. The activated ions then deposit on the various surfaces within the reactor vessel which, in turn, creates an oxide layer on these surfaces. The oxide layer emits radiation which during maintenance presents drawbacks. One such drawback is that nuclear regulations regulate the amount of radiation exposure to workers, and to stay well within these limits during maintenance, the radiation emitted by the oxide layer should be minimized.

Although reductions in personnel exposure to radiation during maintenance have been achieved through the industry's aggressive radiation management programs; obviously, improvements in such a dynamic technological field are always needed. To thoroughly alleviate this radiation exposure problem (i.e., the activated oxide layer), the oxide layer should be removed from the reactor. One method of significantly reducing this source of radiation is to chemically decontaminate the entire primary loop.

To accomplish decontamination, the reactor is deactivated, and a reagent, such as the CAN-DEREM (developed oped by Atomic Energy of Canada, Ltd.) or LOMI (developed in England under a joint program by EPRI and the Central Electricity Generating Board), is passed through the reactor vessel and the primary loop for performing decontamination. Both CAN-DEREM and LOMI are well known in the art for decontamination. The process of decontamination is disclosed in U.S. Pat. No. 5,132,076 which is assigned to the assignee of the present invention.

Although the presently known and utilized method and device for decontamination are satisfactory, they are not without drawbacks. Studies have shown that the reagents used during the decontamination process may cause structural weakening of some components, more particularly the control rod drive shaft. Therefore, the control rod drive shafts should be removed to minimize any such mechanical weakening. In addition, because the control rods have been exposed to radiation, they should, at all times during such removal and storage, be placed in a medium which minimizes radiation exposure to the personnel performing these tasks. Presently, there are no known devices or methods for removing and storing the shafts during decontamination while keeping them in a medium which reduces radiation exposure to the personnel.

Consequently, a need exists for storing the control rod drive shafts in a medium during decontamination.

SUMMARY OF THE INVENTION

The present invention provides an improvement designed to satisfy the aforementioned needs. Particularly, the present invention is directed to a tank containing a liquid for forming a storage medium in which shafts of a nuclear power plant are stored, the tank comprising (a) a lower tank portion having a bottom and a tank wall extending outwardly from the bottom for defining a lower shaft storage cavity of the tank; (b) an upper tank portion having walls removably attached to said lower tank portion for defining an upper storage cavity of the tank, for storing the storage medium when the shafts are stored in the lower tank portion, and (c) a plurality of tubes operatively arranged in a predetermined structural arrangement in said lower tank portion for adaptably receiving the shafts for storage.

In another broad form, the invention resides in a method of storing a shaft of a nuclear power plant in a tank having a lower tank portion removably attached to an upper tank portion, comprising the steps of: (a) flooding a reactor cavity containing the lower tank portion with a liquid to a level above a wall of the lower tank portion for providing a medium for storing the shafts; (b) removably placing the shafts in the lower tank portion for storage while the cavity and lower tank portion are flooded with the liquid to a level above the tank wall of the lower tank portion; (c) removably placing an upper tank portion on the lower tank portion while the cavity is flooded with the liquid to a level above the tank wall of the lower tank portion for providing a storage receptacle for the liquid contained within the tank; and (d) draining the water from the cavity, wherein the tank continues to contain the shafts in the liquid after the cavity has been drained.

It is an object of the present invention to provide a method and device for storing the control rod drive shafts during decontamination.

It is an advantage of the present invention to have the control rod drive shafts placed at all times during removal and storage in a medium which reduces radiation exposure to the maintenance personnel performing these tasks.

It is a feature of the present invention to provide a tank having an upper portion removably attached to a lower portion for storing the control rod drive shafts.

DETAILED DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT(S)

Figure 1:
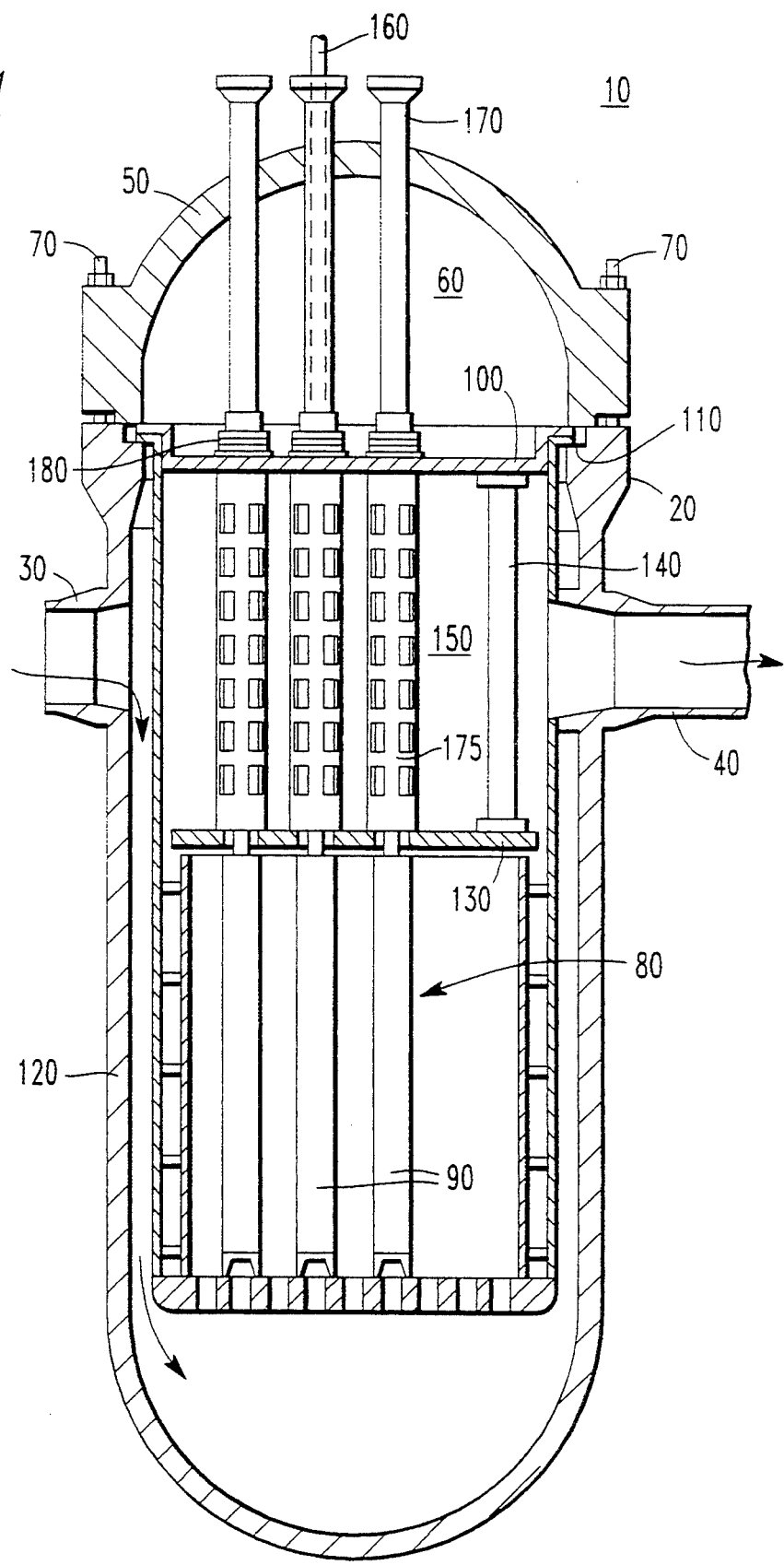
FIG. 1 is a view in vertical cross section of a reactor vessel of a nuclear power plant with portions deleted for clarity.

In the following description, like reference characters designate like or corresponding parts throughout the several views of the drawings. Also, in the following description, it is to be understood that such terms as "forward," "left," "right," "upwardly," "downwardly," and the like are words of convenience and are not to be construed as limiting terms.

Referring to FIG. 1, there is illustrated a typical nuclear power plant reactor, generally referred to as 10, for producing heat by a controlled fission of a fissile nuclear fuel material (not shown). The reactor 10 includes a vertically oriented reactor pressure vessel shell 20 open at its top end and having a plurality of inlet nozzles 30 and outlet nozzles 40 attached to the upper portion thereof (only one of each nozzle is shown). A hemispherical shaped closure head 50 is mounted atop the vessel shell 20 and is sealingly attached to the open top end of vessel shell 20, so that the closure head 50 sealingly caps vessel shell 20 both defining a vessel interior 60. A plurality of bolts 70 are positioned circumferentially around the periphery of the closure head 50 for attaching the closure head 50 to the vessel shell 20. Capping the vessel shell 20 in this manner allows for suitable pressurization of a coolant within the vessel shell 20 as the reactor 10 operates.

A nuclear reactor core 80 is disposed in the reactor 10 for containing the nuclear fuel which is disposed in a plurality of fuel assemblies 90. A horizontal support plate 100 is disposed on a lip 110 positioned on the vessel shell 20 of the vessel interior 60 for transmitting loads from the core 60 and other internal components to a pressure vessel wall 120. A horizontal upper core plate 130 is positioned in spaced apart relationship with the support plate 100, and is held in spaced apart positional relationship with the support plate 100 by a support column 140. This arrangement (support plate 100, upper core plate 130, and support column 140) is generally referred to in the art as an upper internal 150.

A control rod shaft 160 (only one shown in FIG. 1) each extends through a thermal sleeve 170, which is integrally attached to the closure head 50, and through a control rod guide tube 175 where it engages a plurality of movable control rods (not shown) which control the fission process in fuel assemblies 90 in a manner well known in the art of nuclear power production. In this embodiment, a flexureless insert 180 is positioned between the thermal sleeve 170 and the support plate 100, although a flexure insert may also be used, for assisting in regulating the flow of a liquid inside the reactor vessel. Both the flexure and flexureless inserts 180 are well known in the art.

During operation of the nuclear reactor 10, a liquid coolant (i.e., typically borated water) enters the inlet nozzle 30 and, circulates through the reactor core 80 for removing the heat generated within the reactor 10. The coolant that circulates within the vessel shell 20 eventually exits the vessel shell 20 through the exit nozzle 40, whereupon it is piped to a heat transfer device, steam generator (not shown), for generating steam. The steam is then piped from the steam generator to a turbine-generator set (not shown) for producing electricity in a manner well known in the art of nuclear powered electricity production. The coolant then returns to the reactor 10 via the inlet nozzle 30 for repeating the above described process.

Figure 2:
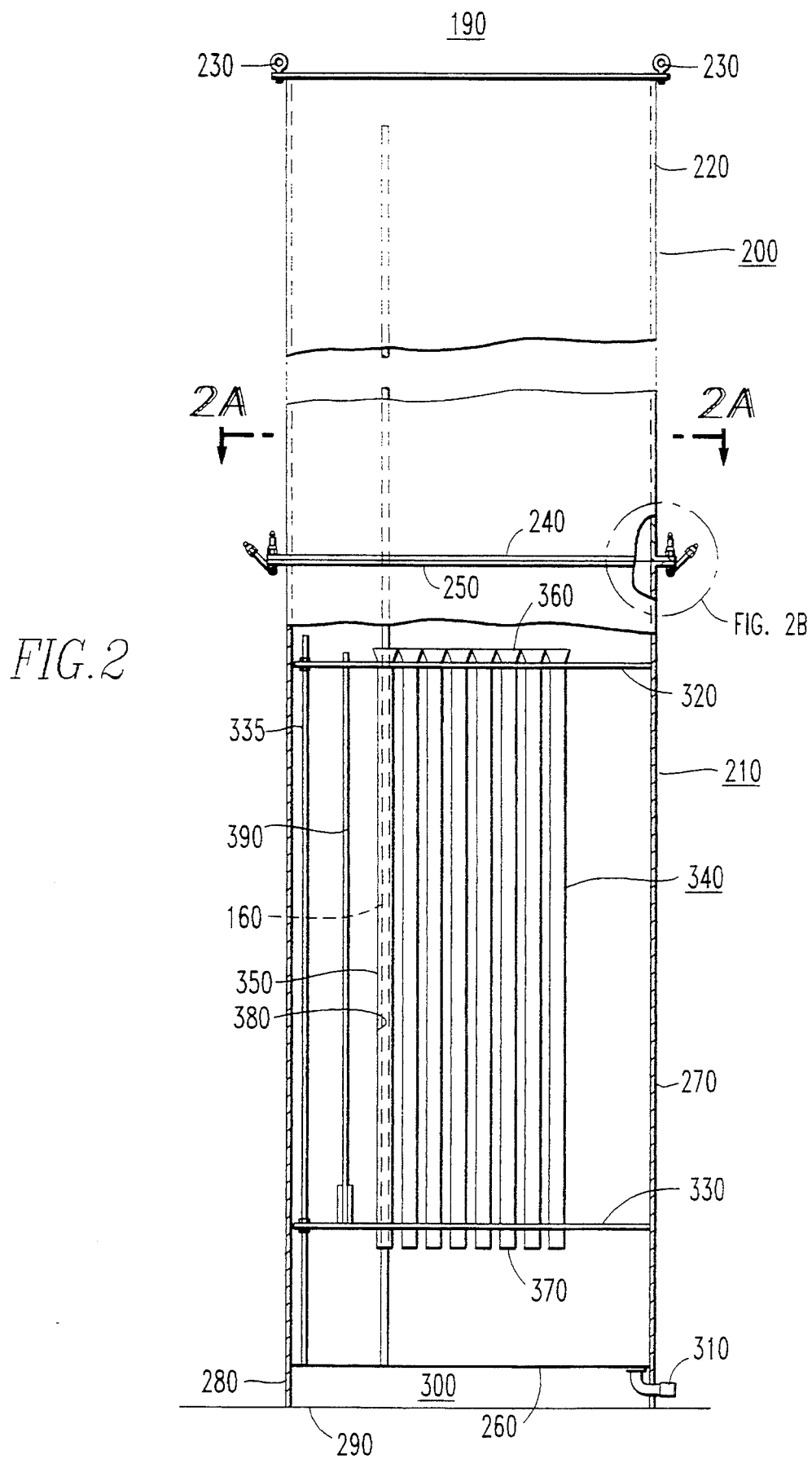
FIG. 2 is a view in side elevation of a tank of the present invention with a portion of the tank cut away.

Referring to FIG. 2, a tank 190 of the present invention having an upper portion 200 removably attached to a lower portion 210 is illustrated for storing the control rod shafts 160 during decontamination. Referring first to the top portion 200, it includes a cylindrical shaped side portion 220 open at both its top and bottom end. Two eyebolts 230 are attached to a top portion of the side portion 220 for allowing a suitable lifting device to grasp and lift the upper portion 200 during installation and the like. A first flange 240 extends around the periphery of a bottom portion of the tank upper portion 200 for mating with a second flange 250 of the lower portion 210.

Figure 2A:
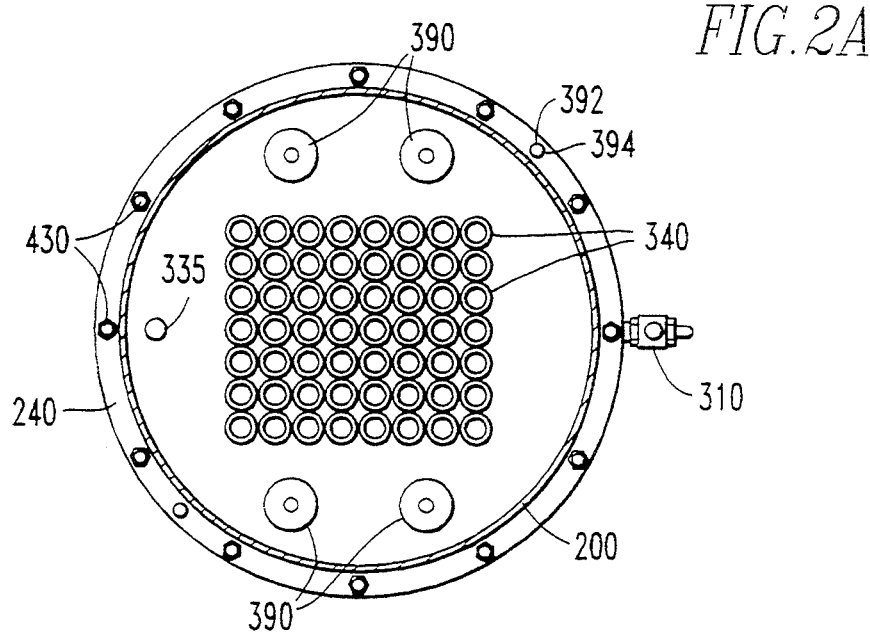
FIG. 2A is a taken along line 2A—2A of FIG. 2.

Referring now to the tank lower portion 210, it includes a generally circular shaped bottom 260 integrally attached to a generally cylindrical shaped side portion 270 extending vertically from the bottom 260 both forming the tank lower portion 210 which, in turn, forms the ultimate enclosure for storing the control rod shafts 160. A portion 280 of the side 270 extends downwardly from the bottom 260 for allowing the bottom 260 to be spaced apart from its supporting surface 290 (i.e., a containment building floor which will be described in detail below) for allowing a space 300 between the bottom 260 and its supporting surface 290. A drain valve 310 is attached to the bottom 260 and projects through a portion 280 of the side 270 for allowing the liquid inside the tank 190, typically borated water, to be drained therefrom. An upper plate 320 and a lower plate 330 are positioned in spaced apart relationship with each other in the lower tank portion 210 for both receiving a plurality of vertically extending storage tubes 340. A member 335 extends between the upper and lower plate 320 and 330 and is attached to the bottom 260 for structurally supporting the upper and lower plates 320 and 330. The tubes 340 include a cylindrical shaped shell 350 open at both ends 360 and 370 for each receiving a control rod drive shaft 160, which extends through the tube 340 and rests on the bottom 260. A bore 380 extends inside each tube 340 for defining the receiving receptacle for the control rod drive shaft 160. As best seen in FIG. 2A, the tubes 340 are arranged in a preselected 7×8 array for defining the storage arrangement, although any arrangement may be used with the present invention. Four vertically extending posts 390 are positioned in a spaced apart relationship around the periphery of the lower tank portion 210 for operatively receiving the flexureless inserts 180, and are structurally supported by the plate 330. Two holes 392 also extend through the first flange 240 each for respectively receiving a corresponding vertically oriented pin 394 in the second flange 250. When the upper portion 200 is placed atop the lower portion 210, the holes 392 are placed in registry over the pins 394 and then lowered down over the pins 392 for properly aligning the upper portion 200 atop the lower ]portion 210.

Figure 2B:
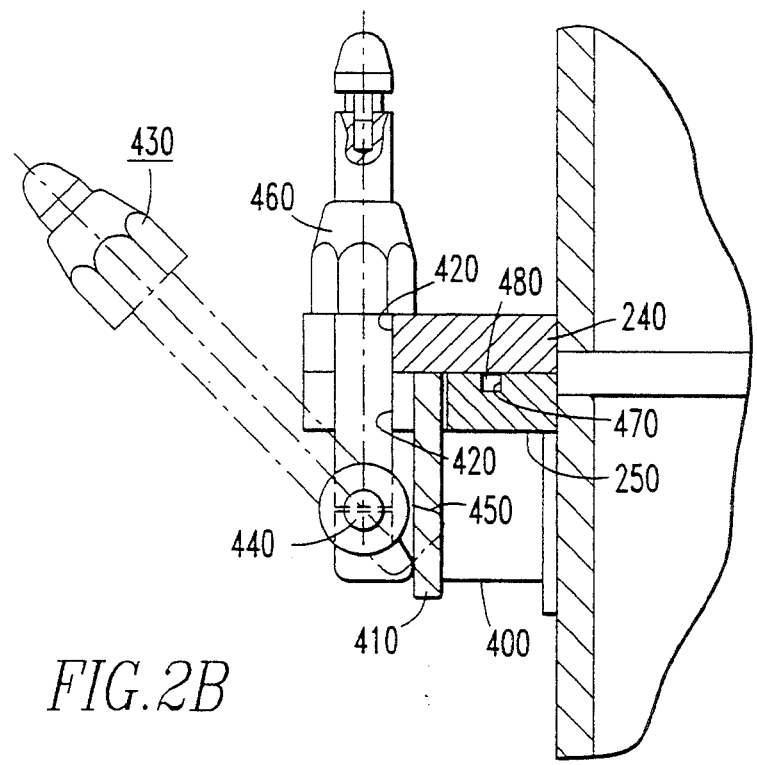
FIG. 2B is an exploded portion of FIG. 2 illustrating a locking mechanism for maintaining the positional relationship of the upper and lower portions of the tank.

As best seen in FIG. 2B, a locking mechanism of the present device is illustrated. A plurality of these locking devices are disposed on the tank 190, although for the purpose of discussion only one locking device will described. The first flange 240 includes an integrally attached pin 410 extending vertically and downwardly from the first flange 240. A plate 400 is integrally attached to the second flange 250 for receiving a movable stud bolt 430. Both of the flanges 240 and 250 each include a U-shaped slots 420 respectively in registry with the slot 420 in the opposite flange for forming a mated pair of slots. Each mated pair of slots 420 receives the movable stud 430, which is attached to the plate 400 via a pin 440. This arrangement allows the stud 430 to pivot about the pin 440 so that the pin 440 is movable into and out of the mated slots 420. A protruding lip 450 extends outwardly at the bottom portion of the stud 430 for contacting the pin 410 which, in turn, rotates the stud 430 into the locked position (solid line position) when the upper portion 200 is placed atop the lower portion 210. A movable nut 460 is then pushed downwardly so that it abuts the first flange 240 for maintaining the positional relationship of the upper 200 and lower tank portions 210.

Figure 3:
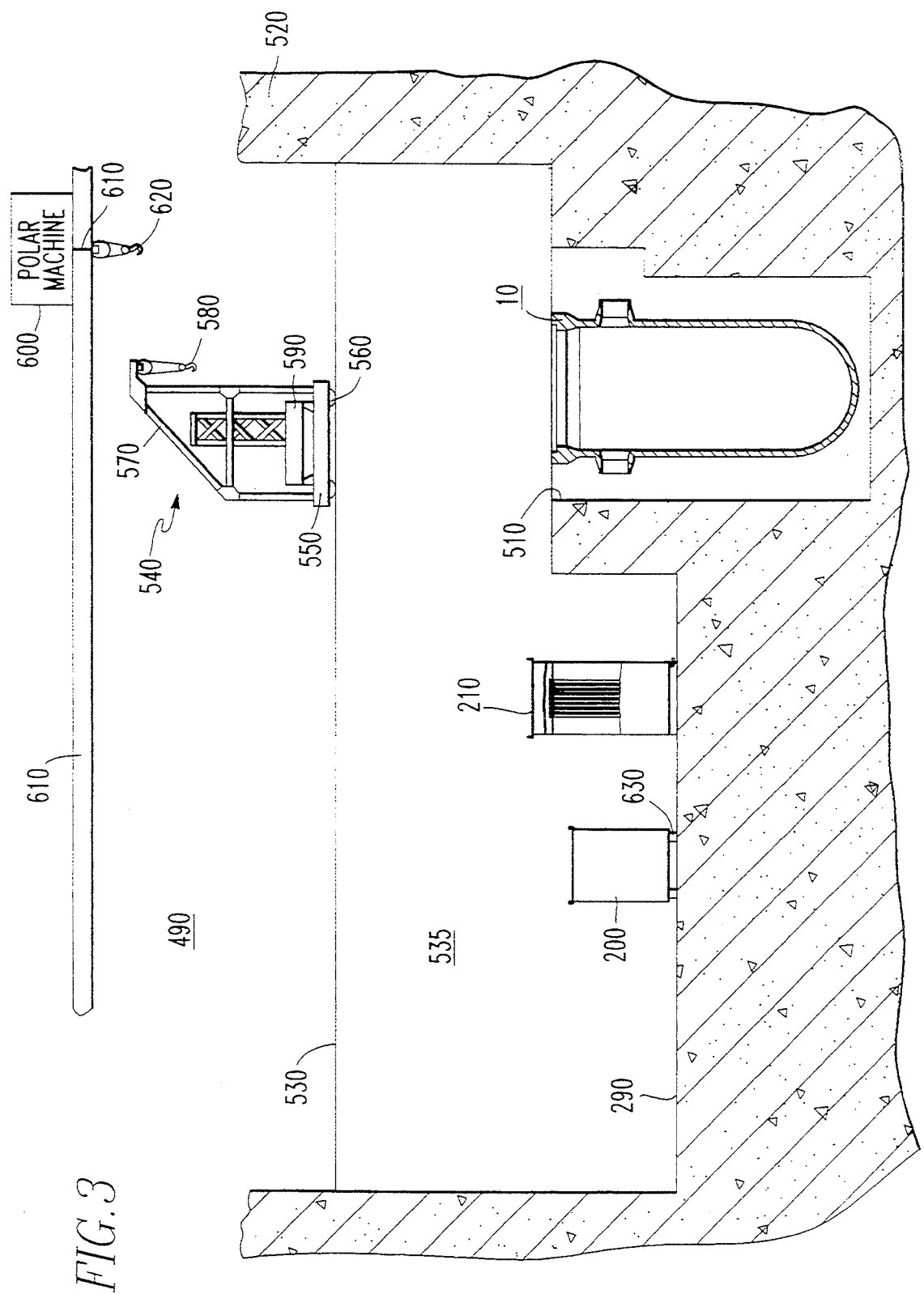
FIG. 3 is a portion of a containment building illustrating the environment of the present invention.

In addition, a groove 470 extends circumferentially around the second flange 250 for matingly receiving a resilient seal 480 disposed therein. The seal 480 functions as a secondary seal for preventing leakage of the liquid from the interior of the tank 190. Referring to FIG. 3, a portion of a containment building 490 is illustrated for completely enclosing the reactor vessel 10 in its interior. The containment building 490 includes the floor 290 having a recessed cavity 510 for receiving the reactor vessel 10. The cavity 510 completely surrounds the vessel shell 20, and the closure head 50 (not shown in FIG. 3) projects upwardly out of the cavity 510 for allowing access to the removable bolts 70. It can be appreciated by those skilled in the art that this bolt access facilitates in the removal of the closure head 50 from the vessel shell 20. The containment building 490 also includes a cylindrical shaped side 520 extending vertically from the floor 290 and a hemispherical shaped dome (not shown) attached atop the side 520 for forming a sealed enclosure for containing any unlikely radiation leakage within the interior of the containment building 490. An operating floor 530 is attached to the side of the containment building 490 and is positioned upwardly and partially over the floor 290 for supporting maintenance equipment. The area between the operating floor 530 and floor 290 is generally referred to in the art as a refueling cavity 535.

As is well known in the art, a movable refueling machine 540 rests on the operating floor 530 for removing and installing portions of the reactor vessel 10. The machine 540 includes a base portion 550 for forming a foundation where maintenance personnel may stand while operating the machine 540. The machine 540 further includes wheels 560 extending from the base portion 550 for allowing the machine 540 to be moved on the floor 530. A frame 570 extends from the base 550, and a hook 580 is connected to a top portion of the frame 570 for grasping portions of the reactor 10. A motor 590 sits on the base 550 for providing the means of lowering and raising the hook 580 and for providing the means for moving the machine 540 on the floor 530. The tank 190, as described in detail above, is partitioned into its two portions 200 and 210 and rests on the floor 290 adjacent the reactor 10 for storing the control rod shafts 160 during the decontamination process.

As is also well known in the art, a movable polar machine 600 is disposed on a rail 610 above the operating floor 530 for assisting in rearranging components within the containment building 490. The polar machine 600 includes a cable 610 attached to the machine 600 at one end and to a hook 620 at its other end.

As best understood by referring to FIGS. 1, 2 and 3, the method of operating the present invention is as follows. The upper portion 200 of tank 190 is detached from the lower portion 210 and rests adjacent the lower portion 210 on a pallet 630 on the containment floor 290. The pallet 630 prevents the pins 410 (see FIG. 2B) on the upper tank 200 from being damaged. The containment building 490 is flooded with a radiation mitigating medium, typically borated water, to a level above the top of the lower portion 210 of the tank 190 but below the operating floor 530. It can be appreciated by those skilled in the art that the level of the medium is adjusted so that when lifting the control rod shafts 160 out of the reactor 10 and placing them in the tubes 340, they are always submerged in the medium.

The closure head bolts 70 are removed by the refueling machine 540, and the closure head 50, including the integrally attached thermal sleeves 170, is then detached from the shell 20 by the refueling machine 540 for allowing access to the interior 60 of the reactor 10. Each flexureless insert 180 is removed by the refueling machine 540 and placed on the posts 390 in the lower tank portion 210. With the above removed, one end of the control rod drive shafts 160 is exposed. As is well known in the art, a gripping tool is lowered over the control rod guide tube 175, and detaches the control rod drive shaft 160 from the control rods for allowing the refueling machine 540 to grasp the exposed end of the control rod drive shafts and place each control rod drive shaft 160 in the tube 340 in the lower tank portion 210.

After all the control rod drive shafts are placed in the lower tank portion 210, an appropriate sling device (not shown) is attached to the hook, and the sling then grasps the eyebolts 230 of the upper tank portion 200 and lifts it directly above the lower tank portion 210. With the two tank portions in alignment, the upper portion 200 is lowered onto the lower portion 210 so the holes 392 in the first flange 240 slips over the pins 394 in the second flange 250. The pin 410 in the first flange 240 also contacts the protruding portion 450 of the stud 430 for moving the stud 430 into its locked position. A long handle socket tool (not shown) is used to torque the nut 460 against the flange 240. The hook 600 via the sling device is left attached to the eyebolt 230, and the end of the cable 610 attached to the polar machine 600 is detached from the polar machine 600 and placed on suitable holding devices (not shown) on the operating floor 530 for facilitating in the removal of the upper portion 200 from the lower portion 210 when the decontamination process is complete.

As is well known in the art, the decontamination process requires that the upper internals 150 and fuel rods be removed from the reactor 10. In this regard, the polar machine 600 is placed over the reactor 10 and is used to remove the upper internals 150, which are placed in an upper interstand (not shown) located on the floor 290. The refueling machine 540 is then placed over the reactor 10 for removing the fuel rods as is well known in the art. The fuel is typically placed in a transfer tube (not shown) for transportation to another portion of the containment building 490 in a suitable manner, as is well known in the art.

The refueling cavity 535 of the containment. building 490 is then drained as is well known in the art. However, the liquid in the interior of the tank 190 is retained therein by the two tank portions 200 and 210 for storing the control rods 160. The closure head 50 is then. reattached to the shell 20, and the decontamination process as described in U.S. Pat. Nos. 5,089,216, 5,132,076 and 5,139,734 all of which are incorporated by reference, is started. After the decontamination process is completed, the above process is performed in reversed order for re-installing the control rod drive shafts 160 in the reactor vessel 10.

It is thought that the present invention and many of its attendant advantages will be understood from the foregoing description and it will be apparent that various changes may be made in the form, construction-and arrangement thereof without departing from the spirit and scope of the invention or sacrificing all of its material advantages, the form hereinbefore described merely a preferred or exemplary embodiment thereof.

We claim:

1. A tank containing a liquid for forming a storage medium in which shafts of a nuclear power plant are stored, the tank comprising:
   (a) a lower tank portion having a bottom and a tank wall extending outwardly from the bottom for defining a lower storage cavity of the tank;
   (b) an upper tank portion having a wall removably attached to said lower tank portion for defining an upper storage cavity of the tank; and
   (c) a plurality of tubes operatively arranged in a predetermined structural arrangement in said lower tank portion for adaptably receiving the shafts for storage and spacing the shafts from the upper tank wall.

2. The tank as in claim 1, wherein said lower tank portion and said upper tank portion both have a generally annular transverse cross section for defining the storage cavity.

3. The tank as in claim 2 further comprising a seal disposed between said upper and lower tank portions for forming a sealed boundary between said upper and lower tank portion.

4. The tank as in claim 3 further comprising a support plate for operatively receiving said plurality of tubes for structural support.

5. A tank containing a liquid for forming a storage medium in which shafts of a nuclear power plant are stored, the tank comprising:
   a lower tank portion having a bottom and a tank wall extending from the bottom for defining a lower storage cavity of the tank;
   an upper tank portion having a wall removably attached to said lower tank portion for defining an upper storage cavity of the tank; and
   a plurality of shaft-receiving tubes in said lower tank portion;
   wherein said upper tank portion has a pin and wherein said lower tank portion and said upper tank portion are removably attached to each other by a bolt attached to said lower tank portion, the bolt having a bolt cam surface, the bolt movable from an unlocked position to a locked position when the pin of said upper portion contacts the bolt cam surface.

6. The tank as in claim 5, wherein said lower tank portion includes a drain for draining the liquid from the tank.

7. The tank as in claim 6 further comprising a plurality of posts arranged in said lower tank portion for operatively receiving and storing inserts of the nuclear power plant.

* * * * *